United States Patent [19]

Rosemeier et al.

[11] 4,295,495

[45] Oct. 20, 1981

[54] CONNECTION NIPPLE

[75] Inventors: Friedrich Rosemeier, Hechingen; Horst Killmaier, Hechingen-Boll, both of Fed. Rep. of Germany

[73] Assignee: Gambro Dialysatoren GmbH & Co. KG., Fed. Rep. of Germany

[21] Appl. No.: 74,499

[22] Filed: Sep. 11, 1979

[30] Foreign Application Priority Data

Sep. 13, 1978 [SE] Sweden .............................. 7809625

[51] Int. Cl.[3] .............................................. F16L 55/10

[52] U.S. Cl. ...................................... 138/89; 138/109; 128/214 D; 220/266; 285/4; 285/DIG. 2

[58] Field of Search ......................... 285/3, 4, DIG. 2; 128/214 D, 272; 220/266, 265, 276; 138/89, 109

[56] References Cited

U.S. PATENT DOCUMENTS

| | | | |
|---|---|---|---|
| 2,724,867 | 11/1955 | Smith | 220/265 X |
| 3,083,858 | 4/1963 | Biedenstein | 220/265 |
| 3,327,709 | 6/1967 | Nehring et al. | |
| 3,368,560 | 2/1968 | Gewecke | 128/272 |
| 3,470,893 | 10/1969 | Nelson | 285/3 X |
| 3,509,879 | 5/1970 | Bathish et al. | 220/266 X |
| 3,664,338 | 5/1972 | Knox et al. | 128/272 X |
| 3,994,412 | 11/1976 | Difiglio | 128/214 D X |

FOREIGN PATENT DOCUMENTS

| | | |
|---|---|---|
| 2356905 | 6/1974 | Fed. Rep. of Germany . |
| 135744 | 2/1977 | Norway |
| 1325041 | 8/1973 | United Kingdom . |
| 1411863 | 10/1975 | United Kingdom . |

*Primary Examiner*—Thomas F. Callaghan

*Attorney, Agent, or Firm*—Lerner, David, Littenberg & Samuel

[57] ABSTRACT

A connection nipple for providing fluid communication with the interior of the container, such as for example a blood bag or the like. The connection nipple comprises a hollow tubular member having a first end which is adapted to be sealingly inserted within the blood bag and a second open end disposed externally of the blood bag. A circumferential rib member is provided circumferentially about the hollow tubular member intermediate the first and second ends. The circumferential rib has a cross-section which tapers substantially to a point to define a connection line about the circumference of the hollow tubular member. A releasable sealing sleeve member is integrally connected to the hollow tubular member in the vicinity of the connection line, and sealing surrounds and completely encloses the second open end of the tubular member to thereby prevent fluid communication with the interior of the blood bag through the second open end. The releasable sealing sleeve member is adapted to be disconnected from the hollow tubular member to expose the second end of the hollow tubular member by twisting of the sleeve member relative to the tubular member to cause the sleeve to break along the connection line.

29 Claims, 3 Drawing Figures

CONNECTION NIPPLE

BACKGROUND OF THE INVENTION

The present invention relates to connection devices in general, and more particularly to connection nipples for containers such as blood bags and the like for providing fluid communication with the interior of the container.

In prior art connection nipples, the connection nipples have comprised a hollow tubular member having opposing open ends. One open end is adapted to be inserted into and fixed in a corresponding seat of the container, such as for example a blood bag, in order to provide fluid communication with the interior cavity of the blood bag, while the other open end, located outside the seat in the blood bag is disposed to be connectable to a line or other device for communication with the inner cavity of the blood bag through the connection nipple.

One disadvantage inherent in such prior art connection nipples is that such arrangements do not always create sufficient protection against contamination of the interior of the blood bag. For example, contamination or ambient air may penetrate into the interior of the bag through the exposed open end of the connection nipple, i.e., the end which is not inserted and fixedly restrained in the seat of the blood bag. This risk of contamination is particularly great before the exposed open end of the connection nipple has been connected to a line and thus sealed off from its surroundings.

While various types of prior art contamination preventing devices have been suggested, such devices have not proven satisfactory in providing a substantially contamination-free environment while at the same time providing a device which is easy to create a satisfactory fluid communication between a line and the inner cavity located within the blood bag.

Thus, one object of the present invention is to provide a connection nipple for blood bags in particular which greatly reduces the risk of contamination of the interior cavity of the blood bag, and by means of which it is easy to create a satisfactory fluid communication between a line and the inner cavity of the blood bag.

SUMMARY OF THE INVENTION

In accordance with the present invention, there is provided a connection nipple for providing fluid communication with the interior of the container, such as for example a blood bag or the like, to overcome these and other disadvantages of the prior art. In particular, the connection nipple of the present invention comprises a hollow member having a first open end which is arranged to be sealingly disposed in fluid communication with the interior of the container, and a second open end which is located exteriorly of the container. The hollow member includes a circumferential rib member arranged about the circumference of the hollow member and which has a cross-sectional shape which tapers to substantially a point to define a circumferential connection line. A releasable sealing member is integrally connected to the hollow member in proximity to the connection line, and completely encloses and seals the second open end of the hollow member. The releasable sealing member is disconnectable from the hollow member by breaking along the connection line to expose the second open end of the hollow member to provide fluid communication with the interior of the container.

In this way, the connection nipple, and in particular the second open end, may be normally sealed to prevent contamination with the interior of the container with which the first end communicates. When it is desired to provide fluid communication with the interior of the container, the releasable sealing member may be easily disconnected from the hollow member by simply breaking it along the connection line. It should be noted that the connection line, because of the tapering cross-section of the rib member, is substantially weaker than the remaining portions of the hollow member and therefore is more likely to fail when subjected to a breaking force.

In accordance with the preferred embodiment, the circumferential rib includes first and second tapering surfaces whose cross-section tapers to substantially a point to define the circumferential connection line, and the releasable sealing member comprises a hollow sleeve having one end connected to the connection line and having the other end completely closed to sealingly enclose the second end of the tubular member. Thus, release of the sleeve may be easily accomplished by a simple twisting action which causes the sleeve to shear at the line of connection with the rib.

Also, in accordance with the preferred embodiment, the rib and sleeve are interconnected such that they together define a substantially smooth exterior connection surface in order to facilitate the twisting action and which is hygienically preferred. Further in accordance with the preferred embodiment, the twisting action is facilitated further by virtue of the fact that the sleeve is provided with a flat gripping portion at the end remote from the connection line and preferably includes indented and raised gripping portions to minimize possible slippage when the sleeve is twisted relative to the tube.

Further in accordance with a preferred embodiment, the hollow tubular member may be provided with a frangible partition which is disposed to create a further protection against contamination of the interior cavity of the container or blood bag when the sleeve has been released from the tube. In this instance, the frangible partition divides the interior of the tube into two spaced chambers one of which communicates with the open end within the interior of the blood bag and the other of which communicates with the second exposed end of the tube. The frangible partition may be easily perforated, and preferably consists of a resilient membrane.

These and further and characteristics of the present invention will be apparent from the following detailed description in which reference is made to the enclosed drawings which illustrate a preferred embodiment of the present invention.

DETAILED DESCRIPTION OF THE PREFERRED EMBODIMENT

Figure 1:
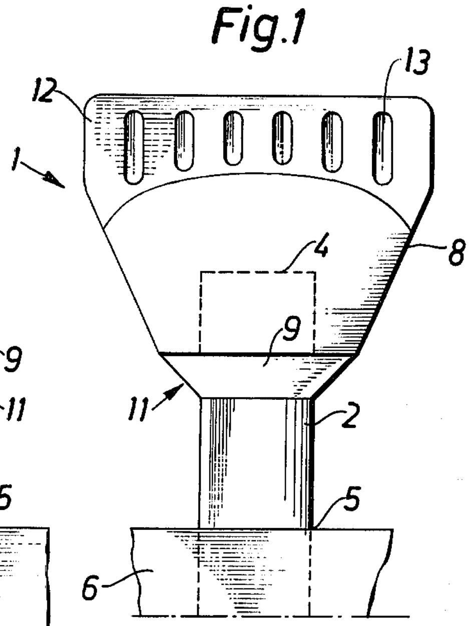
FIG. 1 is a side elevational view of the connection nipple in accordance with the present invention after it has been inserted and fixed retained in a corresponding seat of a container, such as for example a blood bag.
Figure 2:
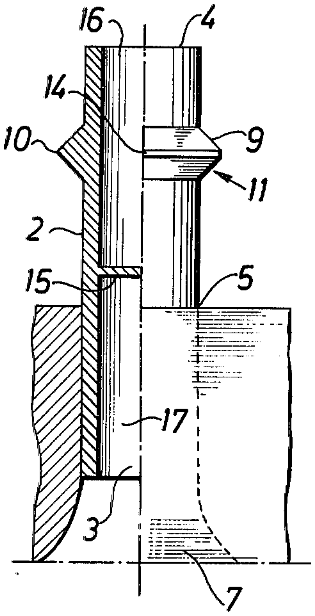
FIG. 2 is a side elevational view, partly in section, of the connection nipple of FIG. 1 after the releasable sealing member has been disconnected.
Figure 3:
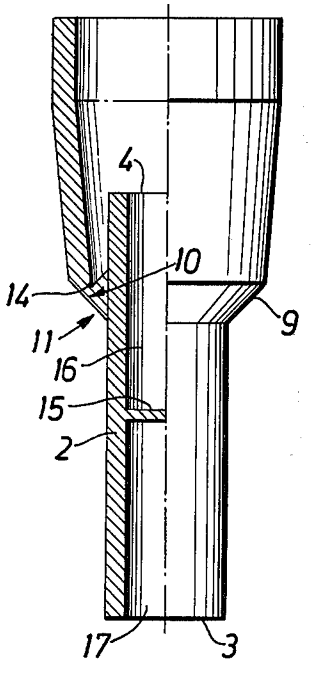
FIG. 3 is a further side elevational view, partly in section, of the connection nipple of FIG. 1, showing the connection nipple removed from the container.

Referring now to the drawings in which like reference characters represent like elements, there is shown in FIGS. 1–3, a connection nipple generally designated 1, in accordance with the present invention for providing fluid communication with the interior of a container 6, such as for example a blood bag or the like. As the present invention is mainly, although not exclusively, intended for use with such types of containers for providing a connection of a blood line with a blood bag for the extracorporeal treatment of blood, in which it is highly desirable to prevent any possible contamination with the interior thereof, the present invention will be described with reference to such containers. In this instance, the connection nipple will not only provide protection for the inner cavity of the blood bag against contamination, or the like, but also will make possible a connection while retaining this protection of a blood line to the blood bag 6 for filling or emptying of the blood bag 6. However, it should be apparent to those skilled in the art that the present invention may be used with other types of containers wherein it is desired that fluid communication with the container be initially prevented when the connection nipple is connected to the container and only thereafter is it desired to provide fluid communication or access to the interior of the container. The connection nipple 1 in accordance with the present invention comprises a hollow tubular member 2 having opposite open ends 3 and 4. One of the two open ends, the end 3, is inserted into ans fixedly retained in a corresponding seat 5 in a blood bag 6 (see FIGS. 1 and 2) in communication with the interior cavity 7 of the blood bag 6. The other open 4, on the other hand, is disposed to be connected to a line (not shown) outside the seat 5.

The other open end 4 of the tube 2 is initially normally sealingly surrounded by a hollow releasable sealing sleeve member 8 which is integrally connected with the tubular member 2 (see FIGS. 1 and 3). More particularly, the tube 2 is provided, intermediate the open ends 3 and 4, with an annular rib 9 which extends about the circumference of the tube 2. The rib 9 has, as most clearly shown in FIG. 3, a cross-sectional shape which tapers outwardly and terminates substantially in a point 10 which thus defines a circumferential connecting line 14 about the tube 2. Preferably, the rib 9 includes oppositely inclined surfaces which incline radially outward and intersect at the connection line 14. The releasable sealing sleeve member 8 has a first end which is integrally connected to the rib 9 in the vicinity of the connecting line 14 defined by the cross-sectional tip or point 10, and a closed second end spaced axially above the second end 4 of the tube 2. By virtue of this arrangement, the sleeve 8 serves to completely surround and enclose the second end 4 of the tube 2 to effectively prevent contamination thereof. Together, the sleeve 8 and the rib 9 form a substantially smooth or planar exterior connection surface 11 which is, in the preferred embodiment, substantially conical.

As can be appreciated in viewing FIGS. 1 and 3, the sleeve 8 flares or expands radially outward in one transverse direction (as viewed in FIG. 1) as it extends upwardly away from its line of connection 14 towards the closed upper end of the sleeve 8, whereas the side portions in a second transverse direction perpendicular to the first direction (as viewed in FIG. 3) are flared outwardly to a lesser extent as they extend away from the line of connection toward the closed end of the sleeve 8. This provides a substantially enlarged upper end of the sleeve 8 having a larger cross-sectional area to facilitate gripping thereof by the user.

Preferably, the upper end portion 12 of the sleeve 8 is designed to provide a substantially flat gripping portion in order to facilitate further a steady finger-and-thumb grip about the sleeve 8 when it is to be twisted in relation to the tube 2. Further, the gripping portion 12 is provided with indentations, and raised parts as for example ridges or grooves 13, in order to further facilitate this gripping action. In this manner, the possibility of slippage when the sleeve 8 is twisted is minimized.

Further in accordance with the preferred embodiment, a frangible resilient membrane 15 is provided so as to divide the interior of the tube 2 into two mutually spaced chambers 16 and 17. One chamber 16 communicates and is connected to the open end 3 of the tube 2 whereas the other chamber 17 communicates and is connected to the other open end 4 of the tube 2. The frangible membrane 15 acts as a further protection for the inner cavity 7 of the blood bag 6 when the sleeve 8 has been released or removed from the tube 2.

In order to disconnect the sleeve member 8 from the tube 2, a simple finger-and-thumb grip is first made around the tube 2, with support against the smooth conical connecting surface 11. Thereafter, a second finger-and-thumb grip is made around the flat gripping portion 12 on the groove or ridges 13. Finally, the sleeve 8 and the tube 2 are twisted relative to one another until the sleeve 8 breaks along its line of connection 14 with the rib 9. This line of connection 14 comprises a relatively weaken portion compared with the wall of the sleeve 8 and the wall of the tube 4 so that the sleeve 8 will break by shearing at the location of the line of connection 14 when subjected to a twisting force. In essence, the line of connection 14 defines the weakest point or line so that when the sleeve 8 and 2 are subjected to relative twisting action, the integral connection will fail by shear.

Once the sleeve 8 has been disconnected from the tube 2, the open upper end 4 of the tube 2 will be exposed so as to be capable of providing access to the interior 7 of the blood bag 6. For this purpose, the resilient membrane 15 may be suitably perforated by means of an annular or similar pointed object which is connected to one end of a blood line for connection to the open end 4 of the connection nipple 1. During this insertion, use may be made of the surface 11 which prevents the fingers of the user from sliding up and coming into contaminating contact with the blood line.

It should be noted that by having the sleeve 8 initially integrally connected to the second end 4 of the hollow tubular member 2, the connection nipple 1 may be maintained in a satisfactorily sterilized condition without the risk of contamination before its intended use. When it is desired to expose the second end 4 of the connection nipple 1 to provide fluid communication to the interior 7 of the blood bag 6, the releasable sealing sleeve 8 may be easily removed, such as for example by a simple twisting action to shear the releasable sleeve 8 along the connection line 14 to expose the second end 4 of the hollow tubular membrane 2.

Thus, it is seen that in accordance with the present invention there is provided a connecting nipple 1 for a container, such as a blood bag 6 or the like, for providing fluid communication with the interior 7 of the container 6. The connecting nipple 1 comprises a hollow tubular member 2 which has first and second open ends 3 and 4, the first open end 3 being adapted to be sealingly connected to the blood bag 6 and the second open end 4 preferably being located exteriorly of the blood bag 6. Intermediate the first and second ends 3, 4, there is provided an annular rib 9 which has a cross-section which tapers away from the tube to substantially a point 10 to define a line of connection 14. A releasable sealing sleeve member 8 is integrally connected to the tubular member 2 in the vicinity of the connection line 14. The releasable sealing sleeve 8 is disposed to surround and enclose the second end 4 of the tube 2 to prevent fluid communication therethrough with the interior 7 of the blood bag 6. The connecting sleeve 8 is adapted to be disconnected from the hollow tubular member 2 preferably by twisting so that the sleeve 8 will break at the line of connection 14 to thereby expose the end 4 of the tube 2. To facilitate this removal, the sleeve 8 preferably includes a substantially enlarged surface area and is provided with gripping portions 12, 13 to facilitate a twisting action with a minimal amount of effort and without slippage.

While the preferred embodiment of the present invention has been shown and described, it will be understood that such is merely illustrative and that changes may be made without departing from the scope of the invention as claimed.

What is claimed is:

1. A connection nipple for providing fluid communication with the interior of a container, the connection nipple comprising:

a hollow member having a first open end and a second open end, the first open end being adapted to be sealingly disposed in fluid communication with the interior of the container, and the second open end being disposed exteriorly of the container;

a circumferential rib member interally disposed about the circumference of said hollow member, said rib member having a cross-sectional shape which tapers to substantially a point to define a connection line about the circumference of said hollow member, said connection line being axially spaced from said secord open end of said hollow member;

a releasable sealing member integrally connected to said rib member in proximity to said connection line and sealingly surrounding said second open end of said hollow member to completely enclose and seal said second open end;

said releasable sealing member being disconnectable from said hollow member to provide access to said second open end by breaking said releasable sealing member substantially along said connection line; and said circumferential rib member extending laterally outward from the surface of said hollow member a distance sufficient so as to provide a support surface for a finger grip when said releasable sealing member is to be disconnected from said hollow member and thereafter.

2. The connection nipple of claim 1 wherein said releasable sealing member is integrally connected to said rib member along an interfacing surface adjacent said connection line, and wherein the distance of said connection line laterally outward from the surface of said hollow member is substantial in comparison to the width of said interfacing surface.

3. The connection nipple of claim 1 wherein said hollow member comprises a hollow tube.

4. The connection nipple of claim 2 wherein said circumferential rib comprises an annular rib disposed about the circumference of said hollow tube.

5. The connection nipple of claim 3 wherein said annular rib includes first and second surfaces extending radially outward from said hollow tube and intersecting one another at said connection line.

6. The connection nipple of claim 4 wherein said first and second intersecting surfaces intersect said hollow tube at axially spaced positions, and taper radially outwardly towards one another at said connection line.

7. The connection nipple of claim 2 wherein said releasable sealing member comprises a hollow sleeve having a first end and a second end, said first end being integrally connected to said rib member in proximity to said connection line and said second end being closed and being axially spaced away from said second end of said tube.

8. The connection nipple of claim 6 wherein the cross-sectional area of said hollow sleeve axially intermediate of said first and second ends of said hollow sleeve is greater than the cross-sectional area of said hollow sleeve at said first end.

9. The connection nipple of claim 6 wherein said hollow sleeve and said rib member form a smooth exterior connection surface with one another.

10. The connection nipple of claim 6 wherein the surface of said hollow sleeve extends transversely outwardly between said first and second ends of said hollow sleeve.

11. The connection nipple of claim 6 wherein said surface of said hollow sleeve intermediate of said first and second ends expands transversely outwardly to a greater extent in a first transverse direction than it does in a second transverse direction which is perpendicular to said first transverse direction.

12. The connection nipple of claim 6 wherein said hollow sleeve terminates at said second end in a substantially flat gripping end.

13. The connection nipple of claim 11 wherein said gripping end at said second end of said hollow sleeve is provided with raised and indented portions to facilitate gripping of said hollow sleeve.

14. The connection nipple of claim 6 wherein said hollow sleeve is disconnectable by relative twisting of said hollow sleeve and said hollow tube to cause said hollow sleeve to fail by shearing along said connection line.

15. The connection nipple of claim 2 further including a frangible partition within said hollow tube to divide said hollow tube into first and second spaced chambers, said first chamber communicating with said first open end of said hollow tube and said second chamber communicating with said second open end of said tube.

16. The connection nipple of claim 14 wherein said frangible partition comprises a resilient membrane.

17. A connection nipple for providing fluid communication with the interior of a container, the connection nipple comprising:

a hollow member having a first open end and a second open end, the first open end being adapted to be sealingly disposed in fluid communication with the interior of the container, and the second open end being disposed exteriorly of the container;

a radially extending circumferential rib member integrally disposed about the circumference of said hollow member, said rib member having a cross-sectional shape which tapers to substantially a point to define a connection line about the circumference of said hollow member said connection line being axially spaced from said second open end of said hollow member;

a releasable hollow sleeve having a first end and a second end, said first end being integrally connected to said rib member in proximity to said connection line, and said second end being closed and axially spaced away said second open end of said hollow member and sealingly surrounding said second open end to completely enclose and seal said second open end of said second member, the cross-sectional area of said hollow sleeve intermediate of said first and second ends of said hollow sleeve being greater than the cross-sectional area of said hollow sleeve at said first end of said hollow sleeve; and said releasable hollow sleeve being disconnectable from said hollow member to provide access to said second open end by breaking said releasable hollow sleeve substantially along said connection line.

18. The connection nipple of claim 17 wherein said releasable hollow sleeve is integrally connected to said rib member along an interfacing surface adjacent said connection line, and wherein the distance of said connection line laterally outward from the surface of said hollow member is substantial in comparison to the width of said interfacing surface.

19. The connection nipple of claim 18 wherein said hollow member comprises a hollow tube.

20. The connection nipple of claim 19 wherein said circumferential rib comprises an annular rib disposed about the circumference of said hollow tube.

21. The connection nipple of claim 20 wherein said annular rib includes first first and second surfaces extending radially outward from said hollow tube and intersecting one another at said connection line.

22. The connection nipple of claim 18 wherein said hollow sleeve and said rib member form a smooth exterior connection surface with one another.

23. The connection nipple of claim 18 wherein the surface of said hollow sleeve extends transversely outwardly between said first and second ends of said hollow sleeve.

24. The connection nipple of claim 18 wherein said surface of said hollow sleeve intermediate of said first and second ends expands transversely outwardly to a greater extent in a first transverse direction than it does in a second transverse direction which is perpendicular to said first transverse direction.

25. The connection nipple of claim 18 wherein said hollow sleeve terminates at said second end in a substantially flat gripping end.

26. The connection nipple of claim 25 wherein said gripping end at said second end of said hollow sleeve is provided with raised and indented portions to facilitate gripping of said hollow sleeve 27. The connection nipple of claim 18 wherein said hollow sleeve is disconnectable by relative twisting of said hollow sleeve and said hollow tube to cause said hollow sleeve to fail by shearing along said connection line.

28. The connection nipple of claim 18 further including a frangible partition within said hollow tube to divide said hollow tube into first and second spaced chambers, said first chamber communicating said first open end of said hollow tube and said second chamber communicating with said second open end of said tube.

29. The connection nipple of claim 18 wherein said frangible partition comprises a resilient membrane.

* * * * *

UNITED STATES PATENT AND TRADEMARK OFFICE

CERTIFICATE OF CORRECTION

PATENT NO. : 4,295,495

DATED : October 20, 1981

INVENTOR(S) : Friedrich Rosemeier and Horst Killmaier

It is certified that error appears in the above-identified patent and that said Letters Patent are hereby corrected as shown below:

Column 2, line 51, after "further" insert --features--.
Column 3, line 32, "ans" should read --and--.
Column 3, lines 41-42, "particulargly" should read --particularly--.
Column 5, line 38, "interally" should read --integrally--.
Column 7, line 13, after "away" insert --from--.

Signed and Sealed this

***Second* Day of *February 1982***

[SEAL]

*Attest:*

GERALD J. MOSSINGHOFF

*Attesting Officer* *Commissioner of Patents and Trademarks*